June 15, 1965  E. R. PRICE  3,189,131
AUTOMATIC SHOE RETRACTOR
Filed Aug. 27, 1962  2 Sheets-Sheet 1

INVENTOR.
EARL R. PRICE
BY Sheldon F. Raizes
ATTORNEY

INVENTOR.
EARL R. PRICE

# United States Patent Office 3,189,131
Patented June 15, 1965

3,189,131
AUTOMATIC SHOE RETRACTOR
Earl R. Price, South Bend, Ind., assignor to The Bendix Corporation, South Bend, Ind., a corporation of Delaware
Filed Aug. 27, 1962, Ser. No. 219,682
9 Claims. (Cl. 188—78)

This invention relates to a brake and more particularly to a retraction device for a secondary shoe of a drum brake of the type wherein an anchor is provided between one pair of adjacent ends of a pair of brake shoes and a strut which floats with the shoes interconnects the other pair of adjacent ends of said pair of brake shoes.

During inoperative position of a well known brake of the type hereinabove described, the brake shoes are retracted wherein one pair of adjacent ends are engaging the anchor pin. Upon actuation of the brake, the primary shoe end leaves the anchor pin and engages the brake drum with the brake drum imparting its rotational movement thereto while the secondary shoe end is forced by the drum and primary shoe, through the strut interconnection to the secondary shoe, against the anchor pin. Upon relieving actuating pressure for the brake, a spring retracts the primary shoe back into engagement with the anchor pin. However, since the secondary shoe is already in engagement with the anchor pin there is no assurance that the secondary shoe will be retracted from the brake drum due to the frictional force between the secondary shoe and a backing plate of the brake imposed by a hold-down spring. Due to the inability of the secondary shoe to return to its fully retracted position, excessive wear and erratic braking has occurred on the secondary brake shoe due to dragging.

Accordingly, it is an object of this invention to provide a retraction device for retracting the secondary shoe of a brake of the type hereinabove mentioned from its drum surface.

Another object of the invention is to provide a retraction device for retracting the secondary shoe of a brake of the type hereinabove described from the brake drum at least a minimum established clearance.

An over-all object of this invention is to provide a retraction device for the purpose hereinabove mentioned which is economical and simple to construct and which still allows the brake to perform in an efficient manner.

Other objects and features of the present invention will become apparent from a consideration of the following description wherein selected example embodiments have been chosen to illustrate the invention. The description proceeds with reference to the accompanying drawings and in which.

Figure 1:
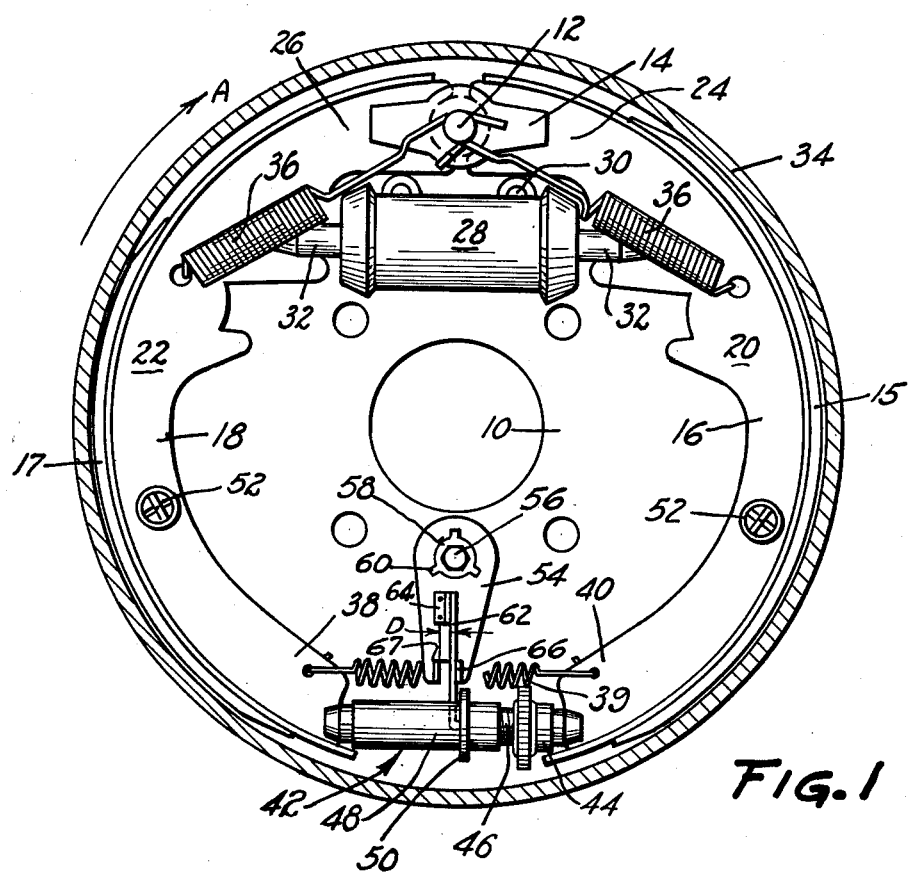
FIGURE 1 is a front elevational view of a drum brake assembly.
Figure 2:
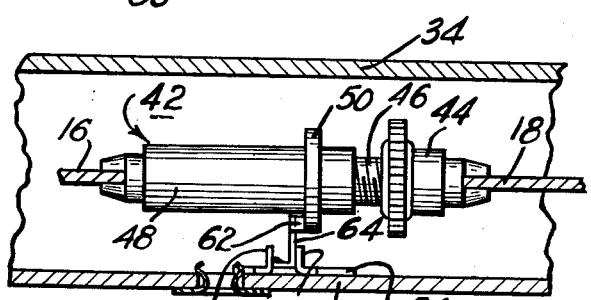
FIGURE 2 is a partial bottom view of the brake of FIGURE 1.

With reference to FIGURES 1 and 2, the brake with which the device of the invention is associated comprises a backing plate 10 mounted on an appropriate part of a vehicle such, for example, as the axle flange, not shown. Positioned on the backing plate is a fixed anchor pin 12 provided with a guide member 14 extending parallel to the backing plate for sliding engagement with webs 16 and 18 of shoes 20 and 22 so as to retain the adjacent ends 24 and 26 in a laterally fixed location with respect to backing plate 10. The shoe ends 24 and 26 are spread apart by a fluid motor 28 secured to the backing plate 10 by any suitable means, such as fastening members 30. The fluid motor includes a pair of oppositely acting pistons, not shown, operatively connected to the shoe ends 24 and 26 through force transmitting links 32. Actuation of the pistons applies a force to each of the links tending to move the shoes toward a rotatable drum 34 which may be secured to a wheel, not shown. Springs 36 have one end attached to the anchor 12 and the other end connected to respective shoes to urge them into contact with the anchor when the fluid motor is not pressurized. The shoe ends 38 and 40 oppositely disposed from the anchor 12 are interconnected by an adjusting strut mechanism 42. The adjusting strut mechanism 42 comprises an adjusting screw socket 44, an adjusting screw 46 and an adjusting screw nut 48. The adjusting screw nut has an annular flange 50 integral therewith for purposes to be described hereinafter. Hold-down springs 52 are utilized to bias the brake shoes 20 and 22 into engagement with the backing plate 10.

The retracting mechanism to which this invention is related comprises a rotatable friction plate 54 which is mounted on the backing plate by a bolt 56. A friction spring 58 has three legs 60 in contact with the friction plate 54 and is compressed between the bolt and the plate 54 for urging the plate into frictional engagement with the backing plate 10. A resilient lever 62 is connected to the frictional plate 54 by a bracket 64 and is preloaded against an abutment 66 which locates the lever 62 a predetermined distance D from an upturned abutment 67 located on the friction plate 54. The lever 62 extends into the path of movement of the flange 50 and is adapted to engage the abutment 66.

In operation, assuming rotation of the drum in the direction of the arrow A, upon pressurization of the motor 28, the primary shoe 20 will have end 24 forced away from the anchor 12 until the lining 15 engages the brake drum 34. The rotation of the brake drum, when in engagement with the friction lining 15, will tend to rotate the brake shoe 20 in a clockwise direction. The shoe 22, which is the secondary shoe, will have its end 26 forced against the anchor 12 by the rotational movement of the drum 34 imparted to the shoe when the lining 17 engages the drum and by the transfer of the movement of shoe 20 through the strut 42. Upon the release of pressure in fluid motor 28, the retraction spring 36 will retract the end 24 of shoe 20 into engagement with the anchor 12 while at the same time moving the friction lining 15 out of engagement with the drum by rotation of shoe end 40 on the adjusting screw nut 48. With respect to the secondary shoe 22, the end 26 is already in engagement with the anchor 12 and without applicant's retracting device it is not certain that the frictional force between the shoe 22 and the backing plate 10, due to the biasing force exerted on the shoe 22 by the hold-down spring 52, will be overcome to retract the lining of the secondary shoe from the drum. Normally, the drum will kick the secondary shoe slightly away from the drum or to a position where the drum will barely contact the lining of the secondary shoe.

With applicant's retracting device it will always be possible to automatically retract the shoe 22 so that its lining 17 is always a predetermined distance from the brake drum regardless of lining wear. This is effected as follows: When the fluid motor is pressurized and the brake shoe 20 is rotated in a clockwise direction, the flange 50 of the strut 42 will engage the lever arm 62 to move the lever arm 62 the distance that the strut 42 moves. Upon pressure release from the fluid motor 28, the resilient lever 62 will return the strut 42 to its retracted position with the spring 39 acting on the shoe 22 to keep the end 38 into engagement with the strut 42. As the lining 17 wears, the travel of shoe 22 to the brake drum will become greater and the adjusting strut flange 50 will move the resilient lever 62 beyond the predetermined distance D, engage the abutment 66 and thereby rotate the friction plate 54 until the lining 17 engages the brake drum. Upon release of pressure in the fluid motor the lever 62 will return the adjusting strut back the distance "D" ensuring at least a clearance of that distance between the friction lining 17 and the brake drum. It follows that the spring 58 produces a frictional force between the friction plate 54 and the backing plate 10 which is much greater than the resilient force of spring lever 62 relative to the friction plate 54 and therefore as lining wears, the friction plate 54 will assume a different radial position.

Figure 3:
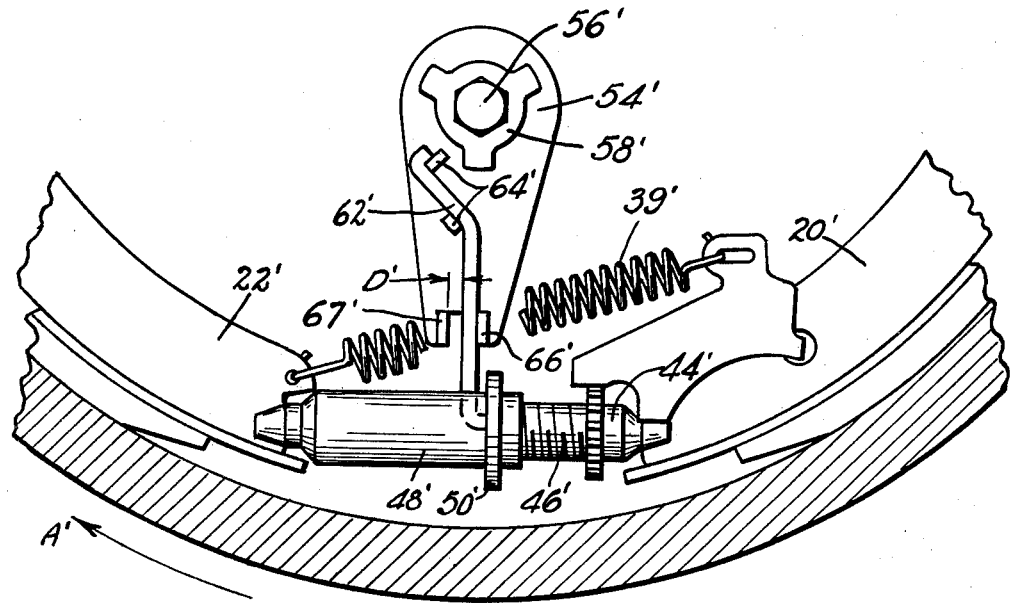
FIGURE 3 is a partial front elevational view illustrating a modified embodiment of the invention.

With relation to FIGURE 3, there is shown a modification of this invention wherein a spring lever 62' is confined between two projections 64' and is preloaded against a projection 66' which locates the lever 62' a predetermined distance D' from the abutment 67'. The retracting device will function in the same manner as that of the embodiment of FIGURE 1. Also shown associated with the retracting mechanism of FIGURE 3 is an automatic adjusting lever which is well known and disclosed in U.S. Patent No. 2,938,610 (common assignee). Of course, an automatic adjusting mechanism may be used in the embodiment of FIGURE 1 or FIGURE 4.

Figure 4:
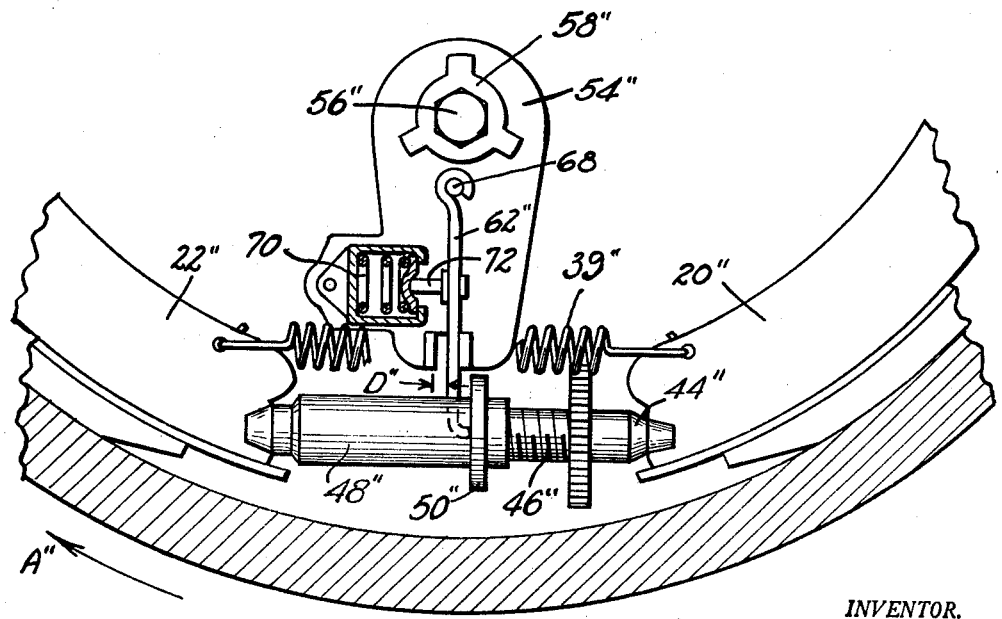
FIGURE 4 is a partial front elevational view illustrating a different modified embodiment of the invention.

Referring to the embodiment of FIGURE 4, an actuating lever 62" is shown pivotally mounted on a pin 68 and connected intermediate its ends to a preloaded spring 70 by a link 72. The operation of the retracting device in this embodiment is the same as in the previous embodiments with the primary shoe being 20", the shoe 22" being the secondary shoe, and the retracting device operating during the rotation of the drum in the direction of arrow A".

The retracting device of this invention is not to be confused with an automatic adjusting device since all that is intended by this device is to retract a secondary shoe a predetermined distance from the brake drum and to ensure such a retraction.

Although this invention has been illustrated and described in connection with specific embodiments, numerous other adaptations of the invention will be apparent to those skilled in the art. I intend to include within the scope of the following claims all equivalent applications of the invention whereby the same or substantially the same results may be obtained.

I claim:

1. In a drum brake; a support, a pair of brake shoes slidably mounted on said support in end-to-end relationship, a strut interconnecting a pair of adjacent ends of said shoes, means maintaining said pair of adjacent ends in engagement with said strut, a member mounted on said support for relative movement thereon to successive new positions on said support, said member having an abutment surface, means producing opposition to movement of said member relative to said support, lever means mounted on said member arranged for engagement with said abutment surface and being biased a predetermined distance away from said abutment surface by a force which is less than said means producing opposition to rotation of said member, said strut having lever engaging means thereon, said lever means being located between said abutment surface and said lever engaging means, said lever means having a portion for engagement with said lever engaging means on said strut, whereby upon movement of said strut in one direction beyond said predetermined distance during brake actuation, said strut will engage said lever means with said abutment means to overcome the force of said means opposing movement of said member to move said member to a new position on said support and upon brake release, said lever means will return said strut said predetermined distance in the opposite direction.

2. The structure as recited in claim 1 wherein said lever engaging means on said strut projects therefrom.

3. The structure as recited in claim 1 wherein stop means is provided on said member for limiting return movement of said lever means.

4. The structure as recited in claim 1 wherein said means for producing opposition to movement of said member relative to said support comprises spring means biasing said member into engagement with said support for producing a frictional force therebetween.

5. The structure as recited in claim 1 wherein said member is rotatably mounted on said support and said lever means comprises a resilient lever mounted on said member.

6. The structure as recited in claim 1 wherein said member is rotatably mounted on said support, said lever means comprises a lever rotatably mounted on said member and being biased by spring means mounted on said member and acting on said lever.

7. The structure as recited in claim 5 wherein said means for producing opposition to movement of said member relative to said support comprises spring means biasing said member into engagement with said support for producing a frictional force therebetween.

8. The structure as recited in claim 6 wherein said means for producing opposition to movement of said member relative to said support comprises spring means biasing said member into engagement with said support for producing a frictional force therebetween.

9. In a drum brake: a support, a pair of brake shoes slidably mounted on said support in end-to-end relationship, a strut interconnecting a pair of adjacent ends of said shoes, means maintaining said pair of adjacent ends in engagement with said strut, a member mounted on said support for relative movement thereon to successive new positions on said support, said member having an abutment surface, means producing opposition to movement of said member relative to said support, lever means mounted on said member having a first portion arranged for engagement with said abutment surface and being biased in a direction away from one of said brake shoe ends a predetermined distance away from said abutment surface by a force which is less than said means producing opposition to rotation of said member, said strut having lever engaging means thereon, said lever means having a second portion for engagement with said lever engaging means on said strut, said second portion of said lever means being located between said one brake shoe end and said lever engaging means, whereby upon movement of said strut in a direction toward said one brake shoe end beyond said predetermined distance during brake actuation, said strut will engage said lever means with said abutment means to overcome the force of said means opposing movement of said member to move said member to a new position on said support and upon brake release, said lever means will return said strut said predetermined distance in the opposite direction.

References Cited by the Examiner

UNITED STATES PATENTS

| 1,991,159 | 2/35 | Kline | 188—79.5 |
| 2,025,673 | 12/35 | Reynolds | 188—78 X |
| 2,035,865 | 3/36 | Cotterman | 188—78 |
| 2,084,972 | 6/37 | Irving | 188—78 X |

EUGENE G. BOTZ, *Primary Examiner.*

ABRAHAM G. STONE, RALPH D. BLAKESLEE, *Examiners.*